United States Patent [19]

Rowley et al.

[11] 4,043,917
[45] Aug. 23, 1977

[54] LIQUID FILTER APPARATUS

[75] Inventors: William N. Rowley, Palos Verdes Estates; Gordon F. Ehret, Alhambra; Robert R. Williams, San Dimas, all of Calif.

[73] Assignee: Weil-McLain Company, Inc., Dallas, Tex.

[21] Appl. No.: 672,732

[22] Filed: Apr. 1, 1976

[51] Int. Cl.$^2$ .................................. B01D 27/04
[52] U.S. Cl. .................. 210/323 T; 210/332; 210/442
[58] Field of Search ........... 210/169, 232, 322, 323 T, 210/333 R, 333 A, 416 R, 437, 442, 450, 457, 332

[56] References Cited

U.S. PATENT DOCUMENTS 1,660,619  2/1928  Klemm .................................. 210/332

Primary Examiner—Thomas G. Wyse
Assistant Examiner—Robert H. Spitzer
Attorney, Agent, or Firm—Lane, Aitken, Dunner & Ziems

[57] ABSTRACT

A liquid filter apparatus in which a plurality of filter units are disposed in a vessel with each of the filter units comprising a perforated tube and a filter material extending around the tube. A collection manifold is located in the upper portion of the vessel and communicates with the tubes of the filter units for receiving the filtered liquid. A cover is provided separate from the manifold for the vessel and the filter units can be disposed into at least two groups extending in a vertically stacked relationship.

5 Claims, 6 Drawing Figures

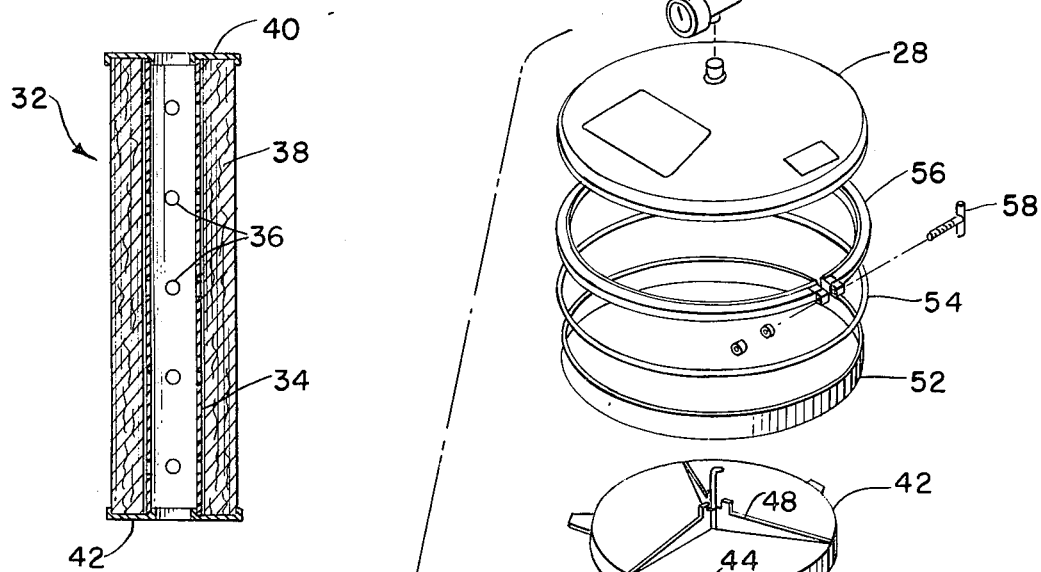
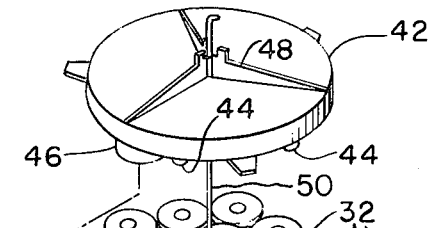
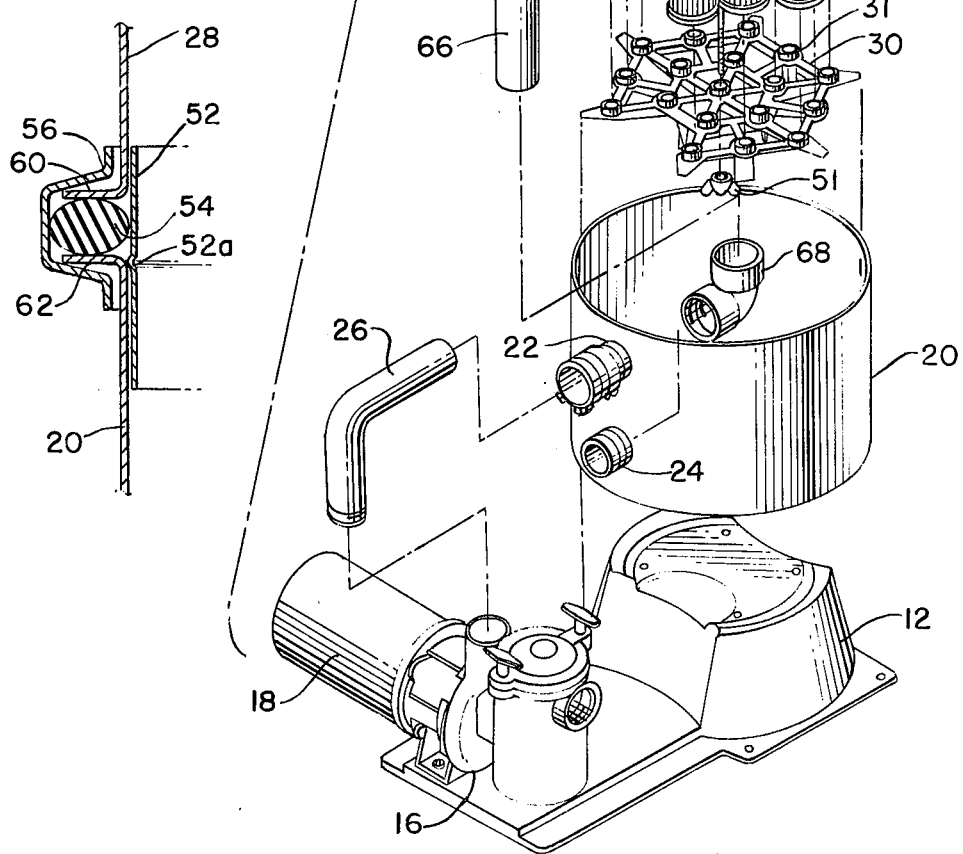

4,043,917

LIQUID FILTER APPARATUS

BACKGROUND OF THE INVENTION

This invention relates to a liquid filter apparatus and more particularly to such an apparatus employing a plurality of individual filter units for filtering liquids.

Several arrangements have been proposed for filtering relatively large quantities of liquid such as swimming pool water or the like, using an assembly of individual cartridge-like filter units. In some of these arrangements, the filter units are disposed in a tank and are attached to a collection manifold located either in the bottom of the tank or to an upper tank chamber defined by the cover for the tank. However, in the case of the manifold being located in the bottom of the tank, relatively large volumes of air may be compressed which leads to potential danger in the event of tank failure or inadvertent removal of the tank cover. Also, the fabrication techniques involved in forming a collection manifold in the tank cover are very complex and therefore costly. An additional disadvantage of the latter arrangement is that it is difficult and time consuming to remove the cover for maintenance, or the like, since a great deal of plumbing must be attached to the cover when it is also used as a collection manifold.

Also in these type arrangements, the assembly must be designed and manufactured for a particular capacity and are not adaptable to varying capacities beyond a limited range.

SUMMARY OF THE INVENTION

It is therefore an object of the present invention to provide a liquid filter apparatus in which a plurality of individual filter units empty into a collection manifold located in the upper portion of a vessel.

It is a further object of the present invention to provide a filter apparatus of the above type in which the upper collection manifold is formed and mounted separate from the vessel cover.

It is a further object of the present invention to provide a filter apparatus of the above type in which the filtering capacity of the apparatus can be varied relatively easily and utilizing a minimum of different parts.

It is a still further object of the present invention to provide a filter apparatus of the above type in which two or more groups of filter units are disposed in a stacked relationship in order to accommodate varying volumes of fluid.

Toward the fulfillment of these and other objects the liquid filter apparatus of the present invention comprises a vessel having an open upper end, an inlet for receiving liquid to be filtered, and a plurality of filter units disposed in the vessel in the path of the liquid, with each of the filter units comprising a perforated tube and filter means extending around the tubes. A manifold is disposed in the upper portion of the vessel and communicates with the tubes of the filter units for receiving the filtered liquid, and a seal-tight cover is provided for the open end of said vessel and is formed separate from the manifold. The filter units can be formed into two or more groups extending in a vertically stacked relation to enable the capacity of the apparatus to be varied with a minimum of different parts.

BRIEF DESCRIPTION OF THE DRAWINGS

FIG. 2 is an exploded perspective view of the filter apparatus of FIG. 1;

FIG. 3 is an enlarged sectional view of an individual filter unit of the filter apparatus of FIG. 1;

FIG. 4 is an enlarged partial sectional view of a portion of the filter apparatus of FIG. 1;

DESCRIPTION OF THE PREFERRED EMBODIMENTS

Figure 1:
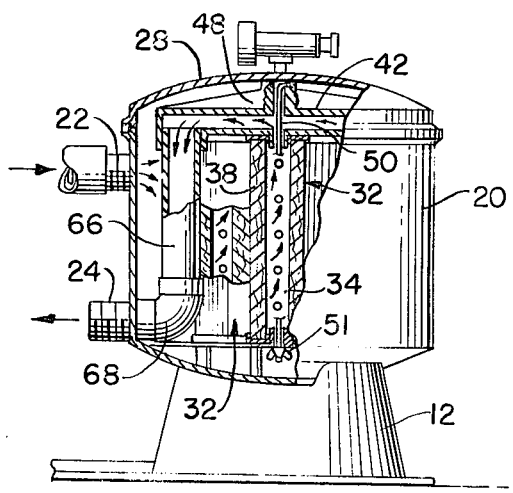
FIG. 1 is a perspective view of the liquid filter apparatus of the present invention shown in an operative relation with a pump-motor assembly for supplying liquid to be filtered.

For the purposes of example, the liquid filter apparatus of the present invention will be described in connection with a swimming pool system in which the filter apparatus filters the pool water. Referring to FIG. 1, the reference numeral 10 refers in general to the filter apparatus of the present invention which is shown mounted on a pedestal 12 which in turn is formed integral with a skid 14. A pump 16 is also secured on the skid 14 and is driven by a motor 18 to pump water in through an inlet 16a formed on the pump housing and out through an outlet 16b to the filter apparatus 10.

As noted in FIG. 1, the apparatus 10 includes a tank 20 having an inlet connection 22 and an outlet connection 24 extending therethrough. The inlet connection 22 is connected to the outlet of the outlet 16b of the pump 16 by a pipe 26, and the outlet connection 24 is externally threaded for connection to a hose or the like for discharging the filtered water back to the swimming pool. The tank 20 has an open upper end over which a cover 28 is mounted in a manner to be described in detail later.

Referring to FIG. 2, the tank 20 is secured to the pedestal 12 by means of a plurality of bolts or the like extending through the bottom or floor (not shown) of the tank and into the pedestal 12. A cartridge support member 30 is provided in the bottom of the tank and is formed of a web-like structure having a plurality of nipples 31 extending from the upper surface thereof for reasons to be described in detail later.

A plurality of cartridge filter units 32 are disposed in the tank 20 and extend over the support member 30, with a typical filter unit 32 being shown in detail in FIG. 3. In particular, each filter unit 32 comprises a central tube 34 having a plurality of spaced perforations 36 extending along its axial length. The tube 34 is surrounded by a mesh material 38 of such construction that finely divided particles such as those found in swimming pools and other bodies of water are trapped on the exterior surface of the material rendering the use of additional filtering aids, such as diatomaceous earth or the like, unnecessary. A top plate 40 and a bottom plate 42 are located at the ends of the tube 34 and material 38 with each of the latter plates having a central opening registering with the respective ends of the tube 34.

Referring again to FIG. 2, the filter units 32 are mounted on the support member 30 with the lower end of each tube 34 registering with a nipple 31 formed on the upper surface of the support member 30.

A collection manifold 42 extends over the upper ends of the filter units 32 and has a plurality of nipples 44 registering with the upper ends of the tubes 34 of the filter units. An outlet 46 is provided through the bottom of the collection manifold and a rigid support strut 48 is secured to the upper surface of the manifold for reasons that will be described in detail later. A tie rod 50 extends through the support member 30, a centrally located filter unit 32 and a central opening in the manifold 42 and has a threaded lower end portion that is engaged by a wing nut 51 to secure these components together.

The cover 28 is secured to the tank 20 by means of a retainer ring 52, an O-ring gasket 54 and a V-band coupler 56 having a bolt assembly 58 in a manner better shown in connection with FIG. 4. In particular, the end portions of the cover 28 and the tank 20 are bent outwardly to form a flange 60 and a flange 62, respectively, that extend in a spaced relationship. The retaining ring 52 rests against the inner surfaces of the tank 20 and cover 28 and is supported in this position by a ledge 52a formed on the outer surface of the ring and extending over the flange 62 of the tank 20. The gasket 54 extends in the space between the flanges 60 and 62, and the V-band coupler 56 extends over the gasket and the flanges and can be tightened by means of the bolt assembly 58 to secure the cover 28 in the position shown.

Again referring to FIG. 2, a pressure release unit 64 is disposed on the cover 28 and includes a manual air release valve 64a.

A pipe 66 extends within the tank 20 and connects the outlet 46 of the collection manifold 42 to an elbow connection 68 which, in turn, registers with the outlet connection 24 of the tank 20.

Figure 5:
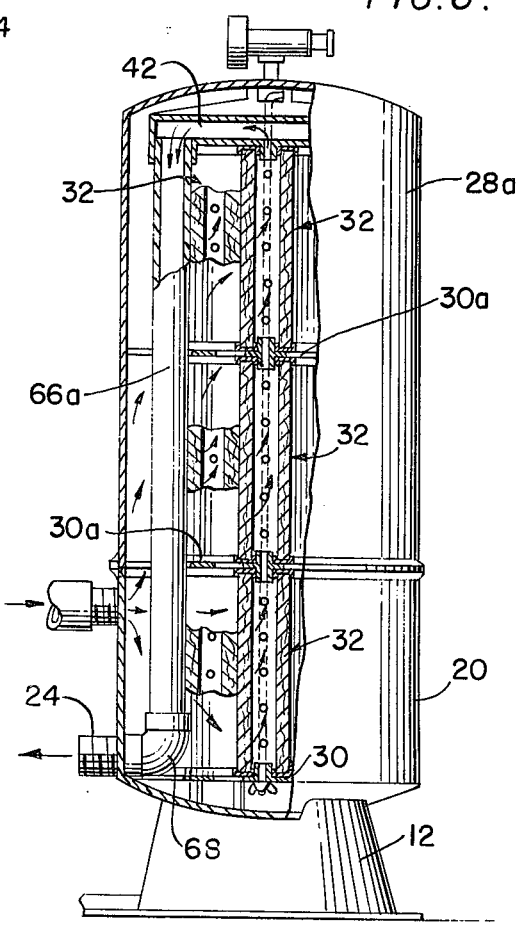
FIG. 5 is a cross-sectional view taken along the line 5—5 of FIG. 1.

The operation of the apparatus of the present invention will be described in connection with FIG. 5 which shows the components of FIG. 2 in an assembled condition. In the latter context, it is noted that when the cover 28 is fastened over the tank 20, the inner surface of the cover comes into intimate contact with the support strut 48 to render the entire assembly completely rigid.

In operation, the water from the pump 16 passes into the tank 20 via the inlet connection 22 and through the mesh material portion 38 of each of the filter units 32, where the finely divided particles are trapped on the exterior surface of the mesh material. The filtered water then passes through the perforations 36 of the tubes 34 of the filter units, into the interior of the tubes and then upwardly into the collection manifold 42. From the outlet 46 of the collection manifold 42, the filtered water passes through the pipe 66, the elbow coupling 68, and exits out the outlet connection 24 for return to the swimming pool.

It is thus seen that the foregoing arrangement minimizes relatively high air pressures accumulating in the assembly yet permits a positive filtering action afforded by the relatively high surface area of mesh material presented to the water to be filtered.

Figure 6:
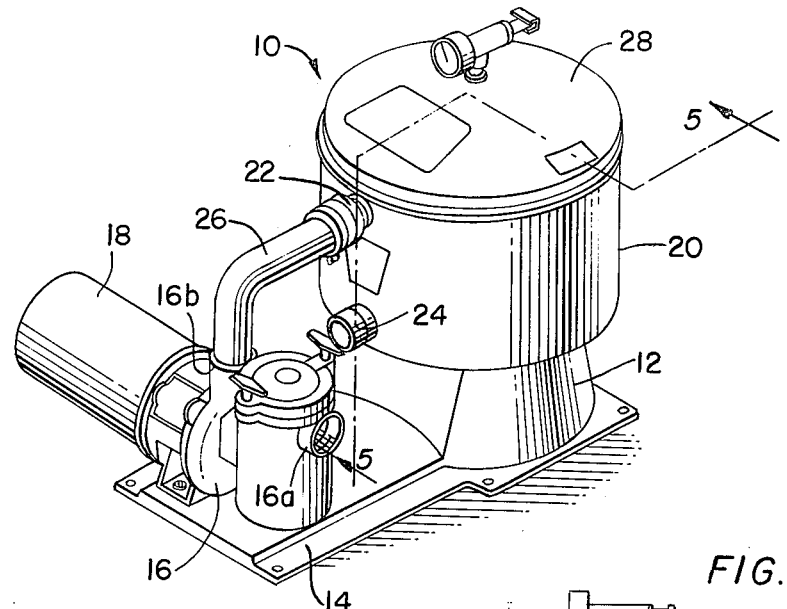
FIG. 6 is a view similar to FIG. 5 but depicting an alternate embodiment of the filter apparatus of the present invention.

The embodiment of FIG. 6 uses identical parts to that of the previous embodiment with the exception that a cover 28a and a pipe 66a are provided which have longer axial lengths than those of the cover 28 and the pipe 66 of the previous embodiment, and that a plurality of support members 30a are provided, each of which has a plurality of nipples 31 extending from both the upper surface and the lower surface thereof. In the embodiment of FIG. 6, three groups of filter units 32 are provided in a vertically stacked relationship. In particular, the lower group of filter units 32 rests on a support member 30 disposed at the bottom of the tank 20 as in the previous embodiment. An intermediate support member 30a extends over the upper ends of the lower group of filter units 32 with the nipples 31 extending from the lower surface of the support member registering with the upper ends of the tubes 34 of the latter filter units. The filter units 32 of the intermediate group extend with their lower ends registering with the nipples 31 formed on the upper surface of the latter intermediate support member 30a and their upper ends in registry with the nipples formed on the lower surface of an additional upper support member 30a. The upper group of filter units 32 are supported by the upper support member 30a in registry with the nipples 31 formed on the upper surface thereof. The upper ends of the upper group of filter units register with the collection manifold 42 in an identical manner as described in connection with the previous embodiment.

The operation of the embodiment of FIG. 6 is identical to that of the previous embodiment, with the filtered water from the collection manifold 42 travelling down the entire length of the pipe 66a to the elbow 68 where it is discharged externally of the tank 20 via the outlet connection 24.

It is thus seen that the apparatus of the present invention has a collection manifold located in the upper portion of the tank, yet can be fabricated at a relatively low cost. Also, the filtering capacity of the apparatus of the present invention can be easily varied by simply adding additional filter units and support members and changing only two components. This, of course, lends a versatility to the apparatus which makes it possible for the apparatus to accommodate varying volumes of liquid according to the particular design of the system.

It is understood that several variations may be made in the foregoing without departing from the scope of the invention. For example, the filter apparatus is not limited to use with a swimming pool nor with a pedestal and skid assembly as shown but can be mounted in any other matter in accordance with conventional practice. Also, the number of groups of stacked filter units can be varied in accordance with particular capacity requirements.

Of course, variations of the specific construction and arrangement of the apparatus disclosed above can be made by those skilled in the art without departing from the invention as defined in the appended claims.

We claim:

1. A liquid filter apparatus comprising:
a vessel having an open upper end, an inlet for receiving liquid to be filtered, and an outlet for discharging filtered liquid;
a unitary assembly removably positioned in said vessel and comprising a plurality of filter units disposed in said vessel in the path of said liquid for filtering said liquid, each of said filter units comprising a perforated tube and filter means extending around said tube, said filter units being formed in at least two groups extending in a vertically stacked relationship, a plate-like member having a plurality of nipples extending from its upper surface and its lower surface and registering with the respective tubes of adjacent groups of filter units for supporting the groups of filter units relative to each other so that the respective tubes of the filter units of each group register with the tubes of the filter of an adjacent group, a collection manifold having an outlet and communicating with a plurality of said filter units for receiving the filtered liquid, and means cooperating with said collection manifold and said support means for releasably securing said groups of filter units in said vertically stacked relationship;

means communicating said vessel outlet with said manifold outlet; and means formed separate from said unitary assembly for providing a seal-tight cover for the upper end of said vessel.

2. The apparatus of claim 1 wherein an aperture is formed through said plate-like member and through said collection manifold; and wherein said securing means comprises tie rod means extending through said apertures.

3. The apparatus of claim 1 wherein said collection manifold has a plurality of nipples formed thereon and registering with said tubes.

4. A liquid filter apparatus comprising a vessel having an open upper end, an inlet for receiving liquid to be filtered and an outlet for discharging filtered liquid, a plurality of filter units disposed in said vessel in the path of said liquid, each of said filter units comprising a perforated tube and filter means extending around said tube, said filter units being formed into at least two groups extending in a vertically stacked relationship, a collection manifold disposed in the upper portion of said vessel and communicating with the tubes of the uppermost group of filter units for receiving the filtered liquid, and means for supporting the groups of filter units relative to each other comprising a plate-like member having a plurality of nipples extending from its upper surface and its lower surface and registering with the respective tubes of said one group of filter units and of said adjacent group of filter units so that the respective tubes of the filter units of each group register with the tubes of the filter units of an adjacent group.

5. The apparatus of claim 4 further comprising means cooperating with said collection manifold and said support means for releasably securing said groups of filter units in said vertically stacked relationship.

* * * * *